United States Patent
Tsymbal et al.

(10) Patent No.: US 8,744,172 B2
(45) Date of Patent: Jun. 3, 2014

(54) IMAGE PROCESSING USING RANDOM FOREST CLASSIFIERS

(75) Inventors: Alexey Tsymbal, Erlangen (DE); Michael Kelm, Erlangen (DE); Maria Jimena Costa, Nuremberg (DE); Shaohua Kevin Zhou, Plainsboro, NJ (US); Dorin Comaniciu, Princeton Junction, NJ (US); Yefeng Zheng, Dayton, NJ (US); Alexander Schwing, Zurich (CH)

(73) Assignee: Siemens Aktiengesellschaft, Munich (DE)

( * ) Notice: Subject to any disclaimer, the term of this patent is extended or adjusted under 35 U.S.C. 154(b) by 398 days.

(21) Appl. No.: 13/160,744

(22) Filed: Jun. 15, 2011

(65) Prior Publication Data

US 2012/0321174 A1 Dec. 20, 2012

(51) Int. Cl.
*G06K 9/00* (2006.01)

(52) U.S. Cl.
USPC .......................................... 382/159; 382/224

(58) Field of Classification Search
USPC ................................................. 382/159, 224
See application file for complete search history.

(56) References Cited

U.S. PATENT DOCUMENTS

| 7,689,016 | B2 * | 3/2010 | Stoecker et al. | 382/128 |
| 8,396,268 | B2 * | 3/2013 | Zabair et al. | 382/128 |
| 2011/0312520 | A1 * | 12/2011 | Kennedy et al. | 506/9 |
| 2012/0148162 | A1 * | 6/2012 | Zhang et al. | 382/195 |
| 2012/0321174 | A1 * | 12/2012 | Tsymbal et al. | 382/159 |

OTHER PUBLICATIONS

Brieman, Leo, "Random Forests", Machine Learning, 45,5-32, 2001.
Domingos, Pedro, et al., "Mining High-Speed Data Streams", In: Proc. KDD, Knowledge Discovery and Data Mining, 2000.
Oza, Nikunj C., et al., "Experimental Comparisons of Online and Batch Versions of Bagging and Boosting", In: Proc. KDD 2001.
Saffari, Amir, et al., "On-line Random Forests", In: Proc. ICCV-OLCV 2009.
Napel, Sandy A., et al., "Automated Retrieval of CT Images of Liver Lesions on the Basis of Image Similarity: Method ad Results", Radiology, vol. 256, No. 1, Jul. 2010.
Spencer, J.A., "Indeterminate lesions in cancer imaging", Clinical Radiology, 63, 843-852 (2008).
Tsymbal, A., et al., "Learning Discriminative Distance Functions for Case Retrieval and Decision Support", Transactions on Case-Based Reasoning, vol. 3, No. 1, 1-16 (2010).

* cited by examiner

*Primary Examiner* — Gregory M Desire

(57) ABSTRACT

A method of performing image retrieval includes training a random forest RF classifier based on low-level features of training images and a high-level feature, using similarity values generated by the RF classifier to determine a subset of the training images that are most similar to one another, and classifying input images for the high-level feature using the RF classifier and the determined subset of images.

20 Claims, 7 Drawing Sheets

FIG. 5

```
for each g_i, i=1..T //priming
    initialize G_i with plain batch RF learning on first P cases      510
end for                                                                    500 for each case x //online learning cycle                              520
    if S=bootstrap
        then set W_x according to Poisson(1)
    else set W_x to 1
    end if
    for each g_i, i=1..T
        parse n_i(x)
        update online feature-class Gaussian statistics for n_i with W_x    530
        if G cases are already observed by n_i then //split
            if S=ERT then                                            540
                generate one candidate split value for each feature at random
                select feature with best gain according to feature-class statistics
            end if
            if S=bootstrap or S=K_best then
                generate N candidate split values for each feature evenly
                determine best split for each feature and corresponding information gain
            end if
            if S=bootstrap then select split feature with best gain
            if S=K_best then select split feature at random from K best
            split node according to selected feature and split value
        end if
        if C cases are already observed by G_i after last memory check then
            if M(g_i)>L then //memory management                     550
                while M(g_i)>L do
                    deactivate node n in G_i with smallest P(n)
                end while
            end if
        end if
    end for
end for
```

IMAGE PROCESSING USING RANDOM FOREST CLASSIFIERS

BACKGROUND OF THE INVENTION

1. Technical Field

The present disclosure relates to image processing, and more particularly, to image processing using Random Forest Classifiers.

2. Discussion of Related Art

Recent machine learning research advances in the area of supervised learning popularized ensemble methods for classification and regression. An ensemble classifier may be used as a tool in medicine to diagnose disease by classifying objects within images of the body. For example, an ensemble classifier may be used to determine whether an abnormal mass is malignant or benign. Factors such as size, number, shape, and texture pattern may have an impact on whether the mass is considered malignant or benign. Computed tomography CT scans may be acquired after a contrast agent is administered to the patient to generate images of the mass. While two lesions may look similar in CT images, they may have originated from different pathologies that pose different risks for the patient.

CT and other radiology images also provide opportunities for content based image retrieval (CBIR). CBIR is also known as query by image content (QBIC) and content-based visual information retrieval (CBVIR). CBIR is the application of computer vision techniques to search for digital images in large databases. While rich metadata about image semantics may be provided by radiologists, current CBIR systems do not fully exploit them.

Examples of ensemble classifiers include Boosting and Random Forests. An ensemble classifier may consist of a set of base classifiers ("experts") that vote to predict unseen data. The commonality of computing the final classification or labeling of the unseen via a summation of "experts" justifies the name ensemble classifiers.

In supervised learning, a training set is used to learn a model M that generalizes well on unseen data when predicting a label y out of available labels L using F-dimensional features. For example, in ensemble methods, the model M is given by equation 1 as follows:

$$M(x) = f\left(\sum_{i=1}^{T} g_i(x)\right) \quad \text{[Equation 1]}$$

with T base classifiers ("experts") $g_i$ and function f casting the result obtained by the summation into a final classifier output.

In Boosting, a number T of weak learners selected during training corresponds to the available experts. A weak learner is a classifier, which is only slightly correlated with the true classification (e.g. it can label examples better than random guessing). One example of Boosting is AdaBoost. In AdaBoost, a classifier model obtained after the learning process is given by equation 2 as follows:

$$M(x) = \text{sign}\left(\sum_{i=1}^{T} \alpha_i h_i(x)\right) \quad \text{[Equation 2]}$$

with both a weighting factor $\alpha_i$ computed and the "weak" learner $h_i(x)$ selected from a possibly infinite dimensional set H of "weak" learners during training. By comparing the general model for ensemble methods given in equation 1 to the AdaBoost classifier model in equation 2, the cast function f=sign and the base classifier "expert" $g_i(x)=\alpha_i h_i(x)$, which is the product of the weighting factor with the "weak" classifier.

In Random Forest (RF), the available experts are T trees composing the forest. For example, T can be several hundred or even several thousand depending on what is being classified. In RF, each node of a tree i provides a probability $p_i(y|x)$ for y∈L, which is obtained during training of the forest. To obtain the final classification rule, a voting of all trees i is performed and the label resulting in the maximum probability is assigned according to equation 3 as follows:

$$M(x) = \text{argmax}_{y \in L} \frac{1}{T}\left(\sum_{i=1}^{T} p_i(y|x)\right). \quad \text{[Equation 3]}$$

However, when all the trees are used in this voting, excessive amounts of processing time may be expended. Using a lesser amount of the trees can reduce the processing time, but may also result in an erroneous classification.

SUMMARY OF THE INVENTION

According to an exemplary embodiment of the invention, a method for performing image retrieval includes training a random forest (RF) classifier based on low-level features of training images and a high-level feature, using similarity values generated by the RF classifier to determine a subset of the training images that are most similar to one another, and classifying input images for the high-level feature using the RF classifier and the determined subset of images.

According to an exemplary embodiment of the invention, a method of training an RF classifier includes initializing a RF structure based on a batch of sample images, updating Gaussian statistics based on features of a next one of the sample images until a certain number of samples are observed given a source of randomness, and refining the RF structure based on the updated Gaussian statistics.

According to an exemplary embodiment of the invention, a method of classifying an image using an RF Classifier includes using a subset of base classifiers of the RF classifier on an input image to output corresponding probabilities, computing an overall probability from the output probabilities, determining whether the overall probability is within a predefined threshold of a desired probability, and using a result of the subset of base classifiers to classify the image if the overall probability is within the threshold.

BRIEF DESCRIPTION OF THE DRAWINGS

Exemplary embodiments of the invention can be understood in more detail from the following descriptions taken in conjunction with the accompanying drawings in which:

FIG. 5 shows an example of pseudo-code that may be used to implement the method of FIG. 4.

DETAILED DESCRIPTION

At least one exemplary embodiment of the invention uses a Random Forest (RF) classifier that is trained with low level features and at least one high level feature to classify images. In another embodiment of the invention, CBIR is achieved using the RF classifier and a search input query. In a further embodiment of the invention a method of training an RF classifier is presented. In yet another embodiment of the invention, the processing used by a RF may be reduced by determining a lesser amount of constituent base classifiers that can still be used to provide a suitable classification. The RF classifier was chosen to be used in conjunction with embodiments of the invention for various reasons. For example, RF was demonstrated to work well with and be robust with respect to high-dimensional data having many weakly relevant, redundant and noisy features, without the need for additional data pre-processing and feature selection. Next, RF-based models are relatively fast to train and to apply as compared with Support Vector Machines. Further, RFs can be trained both for classification and regression problems, support supervised learning from multiple categories, and can easily handle missing values. Moreover, RFs are able to provide an intrinsic RF similarity, which helps to combine the discriminative power and robustness of RFs with the transparency of case retrieval and nearest neighbor classification or regression.

As discussed above, in RF, the available experts are T trees composing the forest. For an RF trained to classify an image or a region of interest in the image (e.g., an RF classifier), the proportion of the trees where two instances appear together in the same leaves can be used as a measure of similarity between them. For example, for a given forest f, the similarity between two instances $x_i$ and $x_j$ is calculated as follows. The instances are propagated down all K trees within f and their terminal positions z in each of the trees ($z_i$=($z_{i1}, \ldots, z_{iK}$) for $x_i$, similarly $z_j$ for $x_j$) are recorded. An RF similarity between the two instances can be represented by equation 4 as follows:

$$S(x_i, x_j) = \frac{1}{k}\sum_{k=1}^{K} I(z_{ik} = z_{jk})$$ [Equation 4]

where I is the indicator function.

Figure 1:
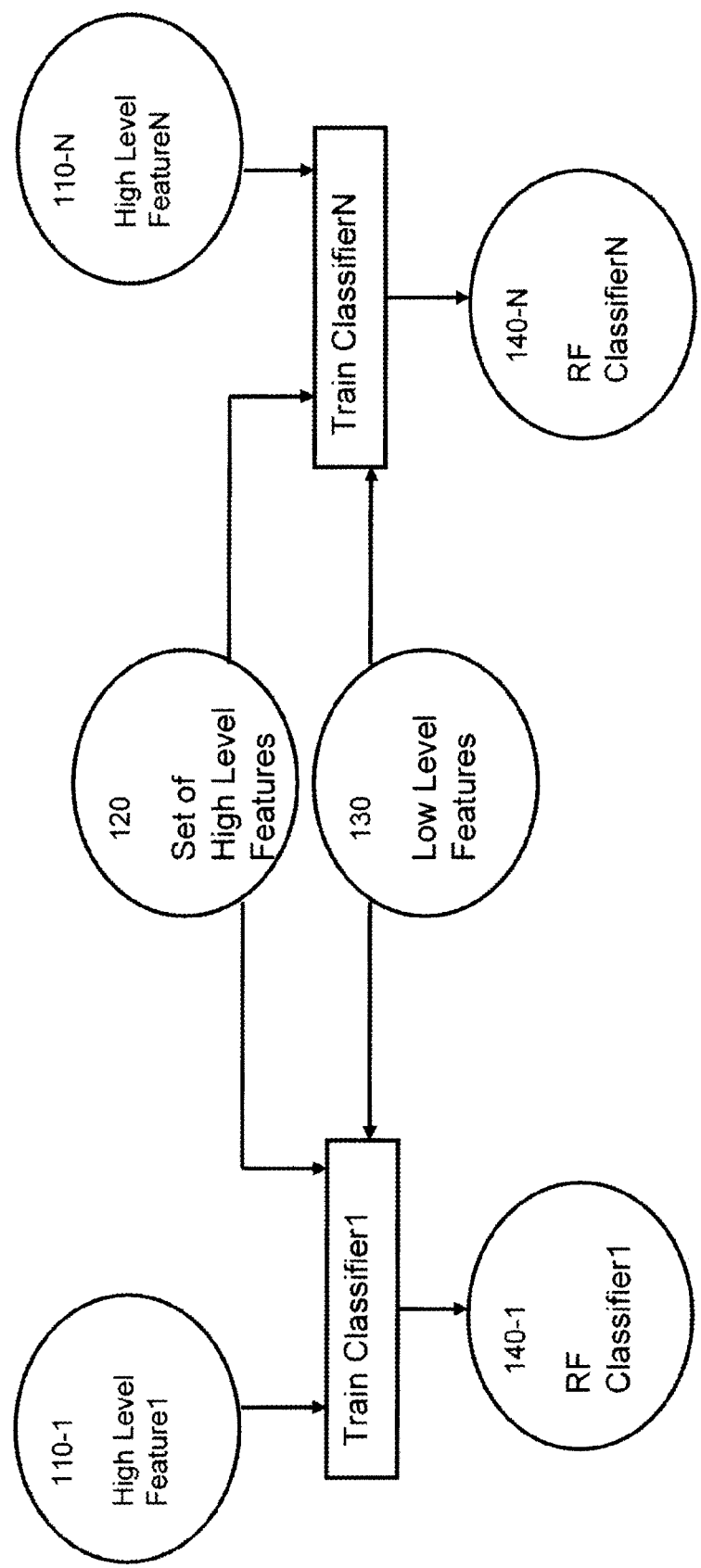
FIG. 1 illustrates an example of a series of RF classifiers being trained for use with exemplary embodiments of the invention.

FIG. 1 illustrates an example of a series of RF classifiers being trained for use with exemplary embodiments of the invention. Referring to FIG. 1, each RF classifier 140-1, ..., 140-N is trained based on a corresponding one of high level features 110-1, ..., 110-N, a set of high level features 120, and low level features 130. The low level features are computer generated from a sample of input images. For example, the low-level features may include pixel intensity, frequency information (e.g., a frequency histogram), normalized central moments, moment invariants applied to intensity distributions, etc.

The high level features are human generated. For example, a clinical expert generates the high level features by annotating one or more of the sample images features based on a characteristic they observe (e.g., contrast agent phase, lesion focality, lesion surrounding, rim continuity, margin, margin definition, density, benignancy, lesion type, etc.). The set of high level features 120 may be a subset of available high level features (e.g., contrast agent phase, margin definition, etc.) The additional high level feature 110-1, ..., 110-N that is applied to each RF classifier 140-1, ..., 140-N may be a high level feature that differs from those of the set of high level features 120 (e.g., density, benignancy, lesion type, etc.). For example, a benignancy RF classifier 140-1 could be trained based on a contrast agent phase, margin definition, and benignancy information, while a lesion type RF classifier 140-2 could be trained based on contrast agent phase, margin definition, and lesion type information.

Figure 2:
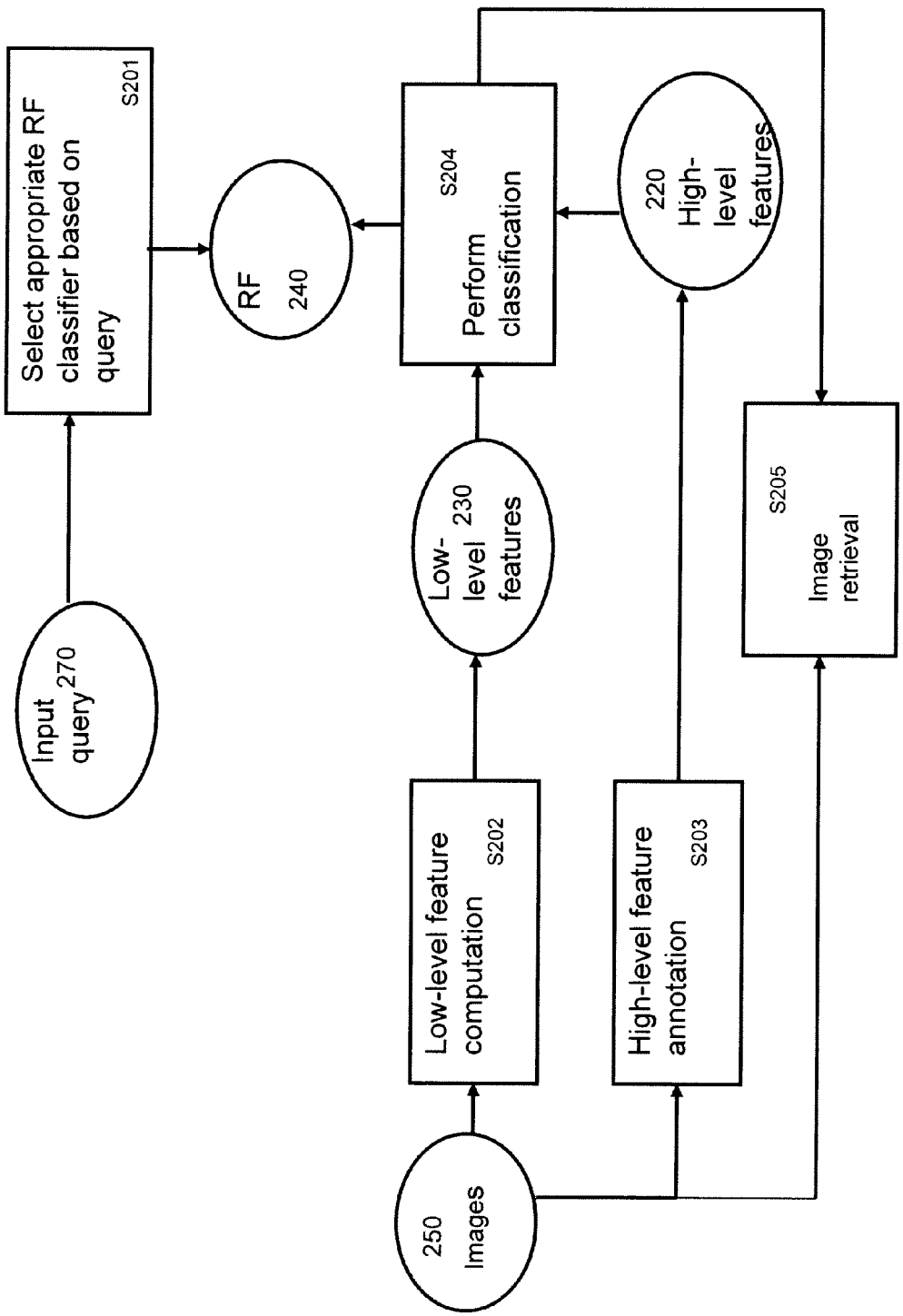
FIG. 2 shows a method of performing image processing using the RF classifiers of FIG. 1 according to an exemplary embodiment of the invention.

FIG. 2 shows a method of performing image processing using the RF classifiers of FIG. 1 according to an exemplary embodiment of the invention. Referring to FIG. 2, the method includes selecting one of the RF classifiers 140-1, ..., 140-N based on an input query 270 to determine the selected RF classifier 240 (S201). The terms of the input query 270 correspond to the high level features in which the RF classifiers were trained. The selected classifier 240 is the classifier that is most suitable for yielding search results for terms of the input query. For example, if the query is "Find lesions with comparable benignancy, in the same contrast agent phase", then a classifier trained with information about benignancy and contrast agent phase may be selected.

Low level features 230 are generated from input images 250 (S202). High level features 220 may be optionally generated by a clinical expert from the input images (S203). The steps of selecting the RF classifier, computing the low-level features, and generating the high-level features may all occur independently of one another.

A classification is next performed on the input images 250 by passing the low-level features 230 and any available high-level features 220 to the selected RF classifier 240 (S204). For example, the samples images that occur in the same terminal nodes of the selected RF classifier 240 as the input images 250 may be noted and later ranked according to the frequency of co-occurrence with the input sample. For example, if the input images 250 are lesions and the query is for "comparable malignancy", the output of the selected RF classifier 240 could be ranking information about how malignant each lesion is (e.g., Benign, Rather Benign, Malignant, Rather Malignant, etc.). Next, the images of these lesions can be retrieved using the ranking information (S205).

In at least one embodiment of the invention, the lesions are liver lesions. Further, the low level features may include whole liver features such as moment invariants. To adapt 2D moment invariants to a 3D liver lesion, for each lesion, 3 orthogonal 2D cuts intersecting at the center of each 2D lesion is generated. The moment invariants can then be calculated for each cut, and the feature vector includes both the moment for each separate cut and the averaged moments.

The above RF classifier 140-1, ..., 140-N may be trained in an offline manner. However, in an exemplary embodiment of the invention, each RF classifier 140-1 or another RF classifier is trained using a combination of an offline and an online approach, which may be adaptive to changes in the underlying data distribution. Online learning is aimed at processing each training example only once "on arrival" without the need to store that example. Instead, a current classification model is maintained that reflects all the training examples seen so far that can be applied to subsequent classifications.

Online learning techniques may perform well when data arrives continuously in the form of a data stream in time, or with very large data sets.

Figure 3:
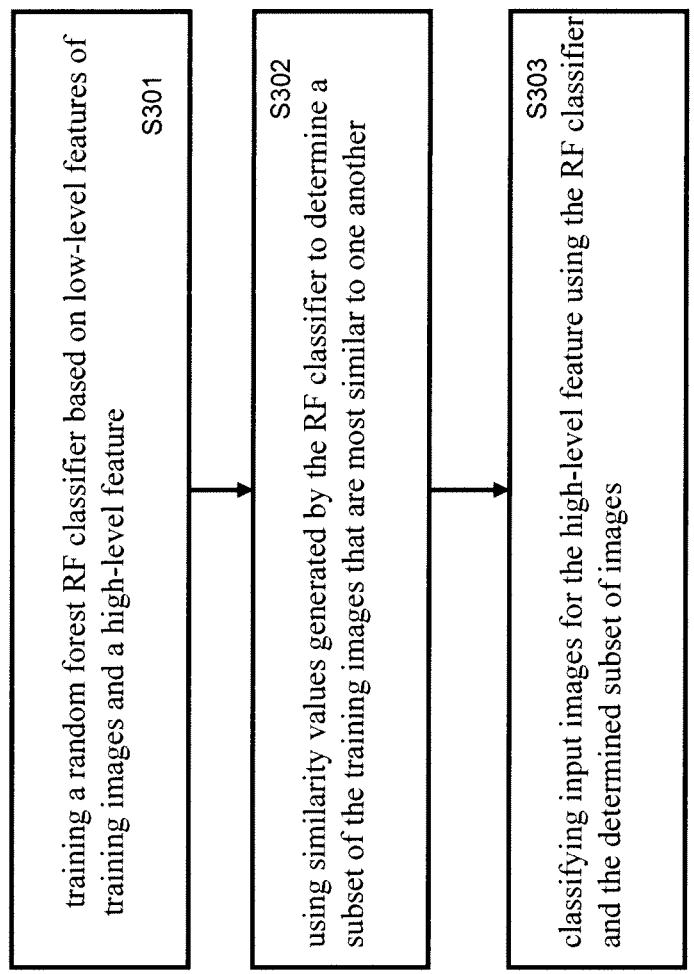
FIG. 3 illustrates a method of performing image retrieval according to an exemplary embodiment of the invention.

FIG. 3 illustrates a method of performing image retrieval according to an exemplary embodiment of the invention. Referring to FIG. 3, the method includes training a random forest RF classifier based on low level features of training images and at least one high level feature (S301). The method further includes using similarity values generated by the RF classifier to determine a subset of the training that are most similar to one another (S302). Each similarity value is the proportion of trees of the RF classifier where a corresponding one of the training images is located in a same terminal node. For example, if two lesion images appear to be in the same terminal nodes in 20 out of 100 trees, the similarity is then 0.2. The method next includes classifying input images for the high level feature using the RF classifier and the determined subset of images (S303). For example, these similarity values can be used to retrieve most similar lesions from the training database, and then an input "test" lesion can be classified against the retrieved similar lesions. This can be especially useful for the diagnostic of smaller lesions since smaller lesions are often difficult to classify even for experienced experts.

Figure 4:
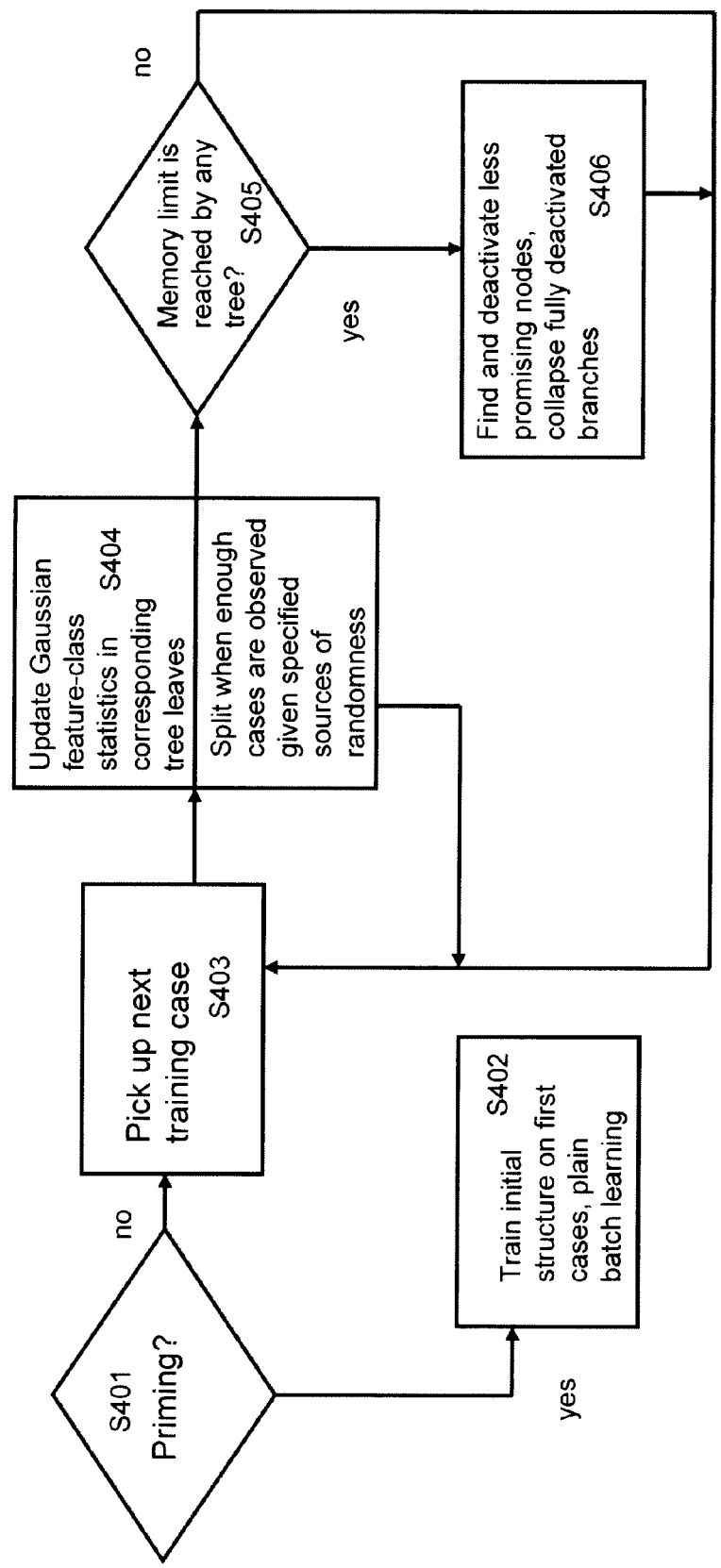
FIG. 4 illustrates a method of training an RF classifier according to an exemplary embodiment of the invention.
Figure 6:
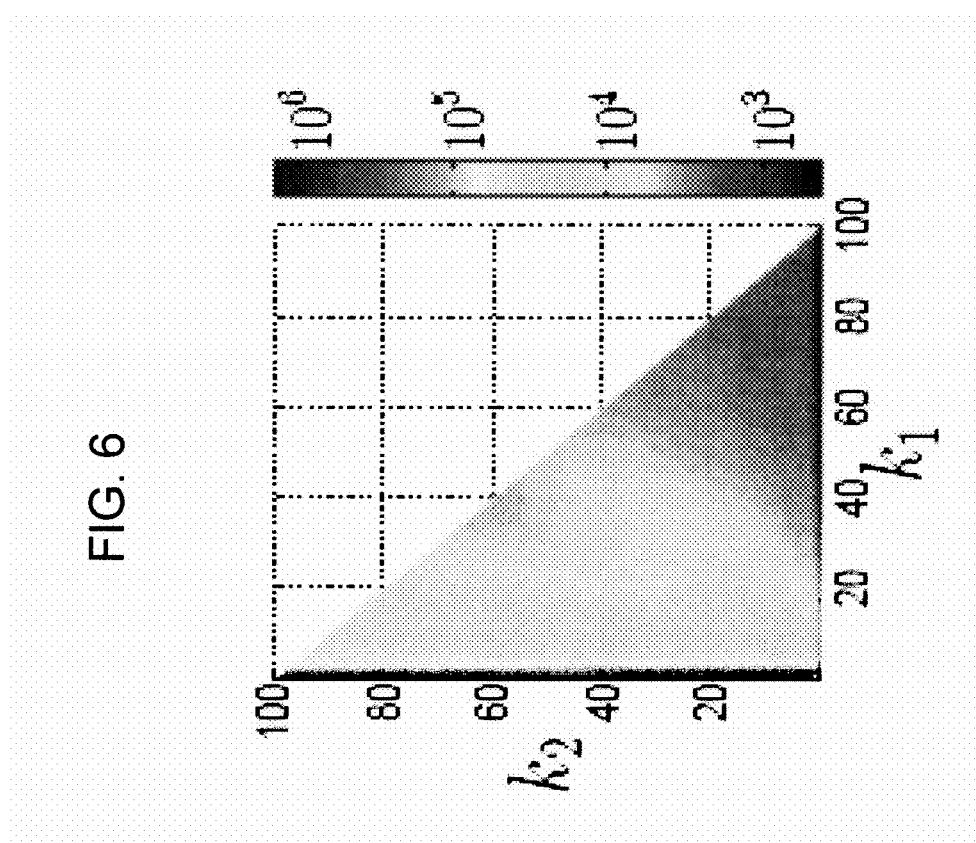
FIG. 6 shows an example of results of test examples being classified.

FIG. 4 illustrates a method of training an RF classifier according to an exemplary embodiment of the invention. Referring to FIG. 4, the method includes model priming from sample cases (e.g., a small sample) to initialize a classification model (S401). For example, a standard RF algorithm may be used on the sample to produce the model. Next, the method creates an initial RF structure based on sample cases (S402). The initial RF structure may include several trees, each with one or more nodes. Next the samples cases are selected one at a time for further processing (S403). A Gaussian Statistics Model on features of an input sample case is generated and then updated based on each new input sample case (S404). During the updating of the Statistics Model, one or more lead nodes of a tree of the RF structure is split into one or more additional nodes after enough cases are observed given a specified source of randomness.

Further, optionally, steps may be performed to minimize the size of the resulting forest based on memory considerations. For example, the method may include determining whether a memory limit has been reached by a given tree (S405), and deactivating or removing less promising tree nodes when the memory limit has been reached (S406). For example, some tree nodes may only apply to a single case, and thus can be pruned away when memory limits have been reached.

FIG. 5 shows an example of pseudo-code 500 that may be used to implement the method of FIG. 4. Referring to FIG. 5 the pseudo-code 500 includes a first section 510 that performs the priming, a second section that 520 updates the Gaussian statistics, a third section 530 that performs the splits, and a fourth optional section 540 that deactivates a node when a memory limit has been reached. Referring to the code 500 of FIG. 5, X is an input stream of training cases, $g_i$ is an $i^{th}$ tree, T is the number of trees, P is the number of cases for priming, C is the number of cases to observe before making a split, M(g) is the memory occupied by tree g in bytes, L is the memory limit for each tree, $n_i(x)$ is a leaf node corresponding to case x in tree $g_i$, P(n) is a promise measure for node n, S is a source of randomness, K is the number of features to consider, N is the number of splits to consider for each feature, and Wx is the weight of case x.

Upon receipt of a new training case, the statistics maintained at the corresponding leaf nodes of each tree are updated. For example, a leaf node corresponding to the training case is identified in the tree, and then the parameters representing a feature-class Gaussian distribution $N_{f\text{-}c}(\mu, \sigma^2)$ at this node is updated accordingly for each feature.

The source of randomness can be chosen from one of three approaches, such as Random sampling with replacement (bagging), completely random split threshold values, or Random selection from K best features. For example, in the first approach, the random source is modeled online via a Poisson distribution defining the weight of each training case. A Poisson distribution may model bootstrap sampling in online learning. In the second approach, split threshold values are generated completely at random, and for each feature, only one candidate threshold is generated. In the third approach, a feature for split is selected at random from K features resulting in best information gain after split.

The splits may be made after a certain specified number of cases are observed at a node (e.g., 20 to 50), and may be referred to as a grace period. In contrast to using a Hoeffding criterion for split generation, this approach helps to reach a faster convergence to an appropriate accuracy. Although slightly weaker component trees are then generated, less training cases are needed to generate an ensemble with competitive accuracy and the overall ensemble does not suffer from this. To determine the best feature-threshold value pair for the split out of the set of candidates, any classical split quality measure can be used, such as the Gini index or Information Gain.

The overall memory consumption by the ensemble of randomized decision trees may be reduced by periodically checking the memory occupied by each individual tree, and after a certain specified number of observed cases, the tree model is updated if necessary not to exceed the limit. For example, certain leaf nodes of the tree model are deactivated. Leaf node deactivation means discarding feature-class distribution statistics stored at them so that this node is not considered as a candidate for splitting any longer. This frees up necessary memory when the memory limit is exceeded by the tree model. To determine which leaf nodes to be deactivated, a leaf node promise measure P(n) is calculated and nodes with the smallest promise are then deactivated. The promise measure of a node l may be calculated using equation 5 as follows:

$$Pr_l = p_l \cdot e_l \qquad \text{[Equation 5]},$$

where $p_l$ is the probability to reach this node and $e_l$ is the observed error in this node. When all child nodes of a split node are deactivated, the corresponding branches can be collapsed to form a single leaf node.

As discussed above, when an RF classifier is used for classification, it refers to its base classifiers ("experts"). However, based on the complexity of the classification task, it may not be necessary to use all of the "experts". Accordingly, in an exemplary embodiment of the invention, a method is presented that adaptively decides how many "experts" of the RF classifier to ask before arriving at a classification. For example, the number of available "experts" T is reduced to K (e.g., referred to as a stopping criteria) during the process of detection depending on the current state of a model $$M_t(x) = f\left(\sum_{i=1}^{t} g_i(x)\right).$$

For example, if T corresponds to 100, K could be reduced to 30.

For binary classification, it can be assumed that each base classifier ("expert") of an RF classifier makes an independent prediction and the experts are equally knowledgeable. For example, each expert has the same probability p to favor a positive label (e.g., mass is malignant) and a probability 1−p to favor a negative label (e.g., mass is not malignant). If the probability p is greater than 0.5 (e.g., the majority of the experts favor a positive label), the sample can be classified as a positive sample. If the probability is less than 0.5 (e.g., the majority of the experts favor a negative label), the sample can be classified as a negative label.

However, the probability p is unknown, but can be inferred from the binary decisions of the experts. Accordingly, an exemplary embodiment of the invention presents a closed-form solution for the distribution of the probability p given the number of experts consulted so far K and the number of experts preferring a specific class label ($k_1$ for the positive, $k_2$ for the negative, and $k_1+k_2=K$). If a consistent classification can be made with a high probability (e.g., greater than 95%) after consulting only K experts, these experts alone can be used for subsequent classifications. For example, FIG. 5 shows a number of test examples from a large scale data set that hits a certain proportion ($k_1$, $k_2$) during the classification process. The variables $k_1$ and $k_2$ are the number of positives and negatives, respectively observed so far in the leaves of the forest. The probability p is the full RF's probability estimate that the example is positive. For example, if 5 trees were accessed, and there were 5 positive predictions ($k_1$) and 0 negatives ($k_2$), p would be very close to 1, so the detection (prediction) process can be stopped at this stage and positive label can be returned.

For a Boosting based classifier (where the "experts" are not independent) or multi-class classification using Random Forest, it can be difficult to calculate the exact distribution of probability p. Thus, in an exemplary embodiment of the invention, an estimated probability $\hat{p}$ and a confidence interval are calculated.

In Random Forest, each tree in the forest has roughly the same performance. Therefore, the determined stopping criterion can be used to speed up Random Forest based two-class classification. For a Boosting based classifier (where the "experts" are not independent) or multi-class classification using Random Forest, it may be difficult to calculate the exact distribution of p. Instead, confidence bands (intervals) for an estimated probability $\hat{p}$ can be calculated, and based on how they compare with each other, one can decide when to stop consulting more "experts."

However, due to the discrete nature of a multinomial distribution, confidence intervals cannot be computed in a straight forward manner. In the following, an approach to determine the stopping criteria is discussed with respect to binomial classification. However, the approach can also be applied to multinomial classification. For both cases, the early stopping criteria can be pre-computed and for subsequent classification one can retrieve a value corresponding to the criteria from a respective position in a table.

If one consults with K "experts" and each expert independently casts a vote for a positive object class with probability p, the probability of observing $k_1$ (where $0 \le k_1 \le K$) positive tests may follow a binomial distribution according to equation 6 below.

$$b(k_1 \mid p, K) = \binom{K}{k_1} p^{k_1} (1-p)^{K-k_1} \quad \text{[Equation 6]}$$

For Boosting as well as for Random Forest, a positive result from "expert" $g_i$ is a vote for the positive class. Using Bayes' rule, and given the object votes $k_1$ and the number of trials K, the distribution p may be calculated according to equation 7 as follows:

$$P(p \mid k_1, K) = \frac{b(k_1 \mid p, K) P(p \mid K)}{\int_0^1 P(k_1, p \mid K) dp} \quad \text{[Equation 7]}$$

where $P(p/K)=P(p)$. Without a priori knowledge about the distribution of p, it can be assumed to be uniform. Consequently, equation (7) can be simplified as according to equation 8 as follows:

$$P(p \mid k_1, K) = \frac{b(k_1 \mid p, K)}{\int_0^1 b(k_1 \mid p, K) dp}, \quad \text{[Equation 8]}$$

which is a valid probability distribution and properly normalized. The binomial distribution given in equation (6) can be plugged into the equation (8) to yield equation (9) as follows:

$$P(p \mid k_1, K) = \frac{(K+1)!}{k_1!(K-k_1)!} p^{k_1}(1-p)^{K-k_1}. \quad \text{[Equation 9]}$$

From equation (9), the estimated probability $\hat{p}=k_1/K$ is a maximum likelihood estimate. However, the unbiased estimate can be computed according to equation (10) as follows:

$$E_{P(p \mid k_1, K)}[p] = \frac{k_1 + 1}{K + 2}. \quad \text{[Equation 10]}$$

The unbiased estimated probability is slightly smaller than the maximum likelihood result. Having computed the distribution for random variable p as given in Equation (10), the probability to make a consistent decision for a positive label may be calculated according to equation 11 as follows:

$$P(p \ge 0.5 \mid k_1, K) = 1 - \frac{(K+1)! 0.5^{k_1+1}}{(k_1+1)!(K-k_1)!} 2F_1(\bullet) \quad \text{[Equation 11]}$$

with $2F_1(\bullet)=2F_1(k_1+1, k_1-K; k_1+2; 0.5)$ being a hypergeometric function. If the probability P of equation (11) exceeds a confidence 1−α, no more "experts" need be consulted. A similar calculation can be made for a negative label (e.g., $P(p \le 0.5 \mid k_1, K)$).

Equation (11) depends on the discrete values for the number of positive tests $k_1$ and total number of tests K. Additionally, since the maximum amount of tests is bounded by the maximum amount of available "experts" ($K \le T$) and the number of positive tests $k_1$ is bounded by the total number of "experts" consulted so far, one need only store a polynomial amount of $$\frac{T(T+1)}{2}$$

values, which is tractable even for a large number of available base classifiers. Consequently the computation of equation (11) can be replaced by a fast table lookup.

Assume the votes for the classes to be given by the vector $[k_1, \ldots, k_{|L|}]$ with $$\sum_{i=1}^{L} k_i = K \leq T$$

being the number of "experts" consulted so far, the maximum likelihood estimator of $p=[p1, \ldots, p|_L|]$ is $\hat{p}=p[\hat{p}_1, \ldots, \hat{p}_{|L|}]$ with $$\hat{p}_i = \frac{ki}{K}.$$

However, in contrast to the binomial case, it can be difficult to derive a closed-form solution for the distribution of $\hat{p}$. Instead, one can compute the confidence range for all the variables of the multinomial distribution of the probability $p \in [0,1]^{|L|}$. Thus, the probability that $p_i$ be within the range $[l_i, u_i]$ should be higher than the confidence $1-\alpha$ as shown below in equation (12) as follows:

$$P(l_i \leq p_i \leq u_i) \geq 1-\alpha. \quad \text{(Equation 12)}.$$

Given the bounds, one can determine whether to stop the classification process or consult with further "experts". For example, one can compare the lower bound of the variable having the highest expected value $\hat{p}_i$ with the upper bound of the others. For example, one can determine $\gamma = \arg \max_{i \in L} \hat{p}_i$ and stop the classification if $l_\gamma - u_i > 0 \forall i \in L \backslash \gamma$ results in $(|L|-1)$ comparisons.

To facilitate the comparison, confidence intervals can be computed for multinomial distributions. When the current proportions are $[k_1, \ldots, k_{|L|}]$ with $$\sum_{i=1}^{|L|} k_i = K,$$

the bounds of $l_i(\alpha)$ and $u_i(\alpha)$ are given by equation (13) as follows:

$$x^2 + 2k_i \pm x(x^2 + 4ki/K(K-ki))^{1/2}/2(K+x^2) \quad \text{(Equation 13)}$$

where $x^2 = x_1^2(\alpha/|L|)$ where $x_1^2(\alpha/|L|)$ could be defined as the $100((1-\alpha/|L|)$ percentage point of a chi-square distribution with 1 degree of freedom. The chi-square distribution is the distribution of a sum of the squares of k independent standard normal random variables. Similar to the binomial case, the bounds $l_i$ and $u_i$ for Equation (12) can be pre-computed using the formula provided in Equation (13) such that computation reduces to a simple table lookup given $\alpha$, $|L|$, $k_i$ and K.

The above systems and methods may be applied to various medical images formats, such as computed tomography (CT) images, magnetic resonance imaging (MRI) images, ultrasound (US) images, etc.

It is to be understood that the systems and methods described herein may be implemented in various forms of hardware, software, firmware, special purpose processors, or a combination thereof. In particular, at least a portion of the present invention may be implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures may be implemented in software, the connections between system modules (or the logic flow of method steps) may differ depending upon the manner in which the present invention is programmed.

Figure 7:
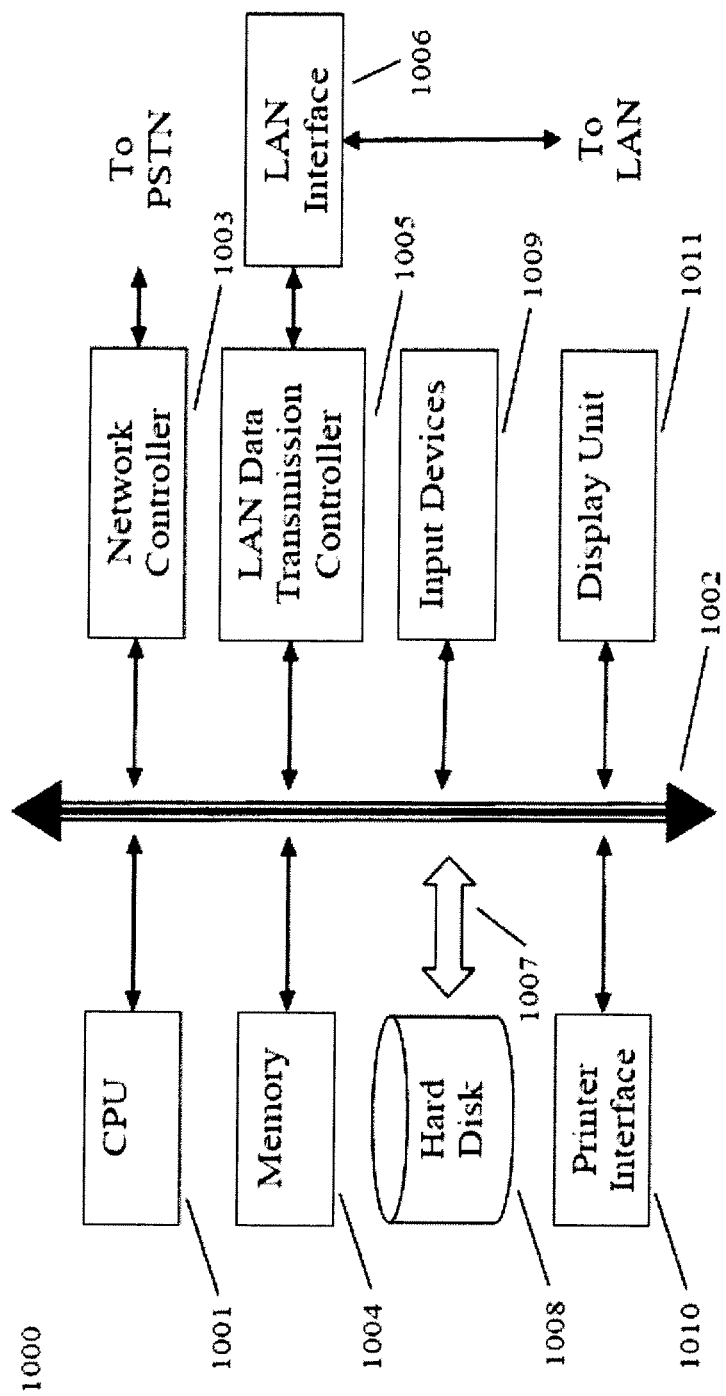
FIG. 7 illustrates an example of a computer system capable of implementing the methods and systems according to embodiments of the present invention.

For example, FIG. 7 shows an example of a computer system, which may implement a method and system of the present disclosure. The system and methods of the present disclosure, or part of the system and methods, may be implemented in the form of a software application running on a computer system, for example, a mainframe, personal computer (PC), handheld computer, server, etc. For example, the methods of FIGS. 2-4 and pseudo-code of FIG. 5 may be implemented as software application(s). These software applications may be stored on a computer readable media (such as hard disk drive memory 1008) locally accessible by the computer system and accessible via a hard wired or wireless connection to a network, for example, a local area network, or the Internet.

The computer system referred to generally as system 1000 may include, for example, a central processing unit (CPU) 1001, a GPU (not shown), a random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007. CPU 1001 may be the computer processor that performs some or all of the steps of the methods described above with reference to FIGS. 1-6.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention.

What is claimed is:

1. A method of performing image processing, the method comprising:
   training a random forest RF classifier based on low-level features of training images and a high-level feature of the training images;
   using similarity values generated by the RF classifier to determine a subset of the training images that are most similar to one another; and
   classifying an input image for the high-level feature using the RF classifier and the determined subset of training images.

2. The method of claim 1, wherein each similarity value is a proportion of trees of the RF classifier where two or more of the training images are located in a same terminal node.

3. The method of claim 1, wherein the high-level feature is human generated by the human manually annotating at least one of the training images.

4. The method of claim 1, wherein the low-level features are automatically generated by a computer analysis of the training images and the high-level feature is manually generated by a human analysis of the training images.

5. The method of claim 1, where the method further includes extracting a high-level feature from the input image and the classifying is further based on the extracted high-level feature.

6. The method of claim 1, wherein the RF classifier is selected from among a plurality of classifiers based on an input search query that requests images that are similar with respect to predicting the high level feature.

7. The method of claim 6, wherein the plurality of classifiers are initially trained, and this training comprises:
selecting a subset of a plurality of high-level features;
training each classifier based on at least one high-level feature of the subset; and
training each classifier based on a corresponding one of the remaining high-level features.

8. The method of claim 7, wherein the subset of high-level features may include at least one of contrast agent phase, lesion focality, lesion surrounding, rim continuity, margin, and margin definition.

9. The method of claim 7, wherein the remaining high-level features may include at least one of tissue density, benignancy, or lesion type.

10. The method of claim 1, wherein the input training images are of liver lesions.

11. The method of claim 1, wherein the training of the RF classifier comprises:
initializing an RF structure based on the subset of training images;
updating Gaussian statistics based on features of a next one of the training images until a certain number of the training images are observed given a source of randomness; and
refining the RF structure based on the updated Gaussian statistics.

12. The method of claim 11, further comprising:
determining whether a memory limit is reached by a tree of the RF structure; and
deactivating at least one tree node of the tree when the memory limit is reached.

13. The method of claim 11, wherein the refining comprising adding a node to a leaf in the tree.

14. The method of claim 11, wherein each leaf in a tree in the RF structure includes a part of the Gaussian Statistics.

15. A method of training a Random Forest RF classifier, the method comprises:
initializing a RF structure based on only a batch subset of sample images among a larger set of sample images;
updating Gaussian statistics based on features of a next one of the larger set of sample images other than the subset until a certain number of samples are observed given a source of randomness; and
refining the RF structure based on the updated Gaussian statistics.

16. The method of claim 15, wherein the source of randomness is modeled via a Poisson distribution defining a weight for each sample image.

17. The method of claim 15, further comprising:
determining whether a memory limit is reached by a tree of the RF structure; and
deactivating at least one tree node of the tree when the memory limit is reached.

18. The method of claim 15, wherein the subset is determined by:
training a random forest RF classifier based on low-level features of the larger set of samples images and a high-level feature of the larger set of sample images; and
using similarity values generated by the RF classifier to determine the subset that are most similar to one another.

19. The method of claim 18, wherein each similarity value is a proportion of trees of the RF classifier where two or more of the sample images are located in a same terminal node.

20. The method of claim 18, wherein the low-level features are automatically generated by a computer analysis of the sample images and the high-level feature is manually generated by a human analysis of the sample images.

* * * * *